(12) United States Patent
Nam

(10) Patent No.: US 8,041,916 B2
(45) Date of Patent: Oct. 18, 2011

(54) DATA STORAGE DEVICE AND METHOD OF OPERATING THE SAME

(75) Inventor: Seok-jeong Nam, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 915 days.

(21) Appl. No.: 12/031,016

(22) Filed: Feb. 14, 2008

(65) Prior Publication Data

US 2008/0201539 A1  Aug. 21, 2008

(30) Foreign Application Priority Data

Feb. 15, 2007 (KR) .................. 10-2007-0016120

(51) Int. Cl.
*G11C 11/34* (2006.01)
*G11C 7/00* (2006.01)
*G06F 12/00* (2006.01)

(52) U.S. Cl. .................. 711/170; 365/185.33; 365/200; 711/103

(58) Field of Classification Search .................. 711/153, 711/154, 170, 173, 118, 129, 202, 205, 206, 711/207, 103; 710/68; 714/48, 6, 7; 345/555; 365/200, 185.33

See application file for complete search history.

(56) References Cited

U.S. PATENT DOCUMENTS

| 5,848,009 A * | 12/1998 | Lee et al. ................. 365/200 |
|---|---|---|
| 2007/0081401 A1 * | 4/2007 | Chen ....................... 365/200 |
| 2008/0126855 A1 * | 5/2008 | Higashijima et al. ........ 714/16 |

FOREIGN PATENT DOCUMENTS

| JP | 05-314019 | 11/1993 |
|---|---|---|
| KR | 1999-55972 | 7/1999 |
| KR | 2002-54464 | 7/2002 |
| KR | 2004-23843 | 3/2004 |

* cited by examiner

*Primary Examiner* — Kevin Ellis
*Assistant Examiner* — Mehdi Namazi
(74) *Attorney, Agent, or Firm* — Stanzione & Kim, LLP

(57) ABSTRACT

A data storage device and a method of operating the same include firmware recognizing that the data storage device has a smaller than normal capacity or includes a routine in the firmware when the number of bad blocks exceeds the maximum. Therefore, even if the number of bad blocks exceeds the maximum, the data storage device having a capacity smaller than the normal capacity can be used.

13 Claims, 8 Drawing Sheets

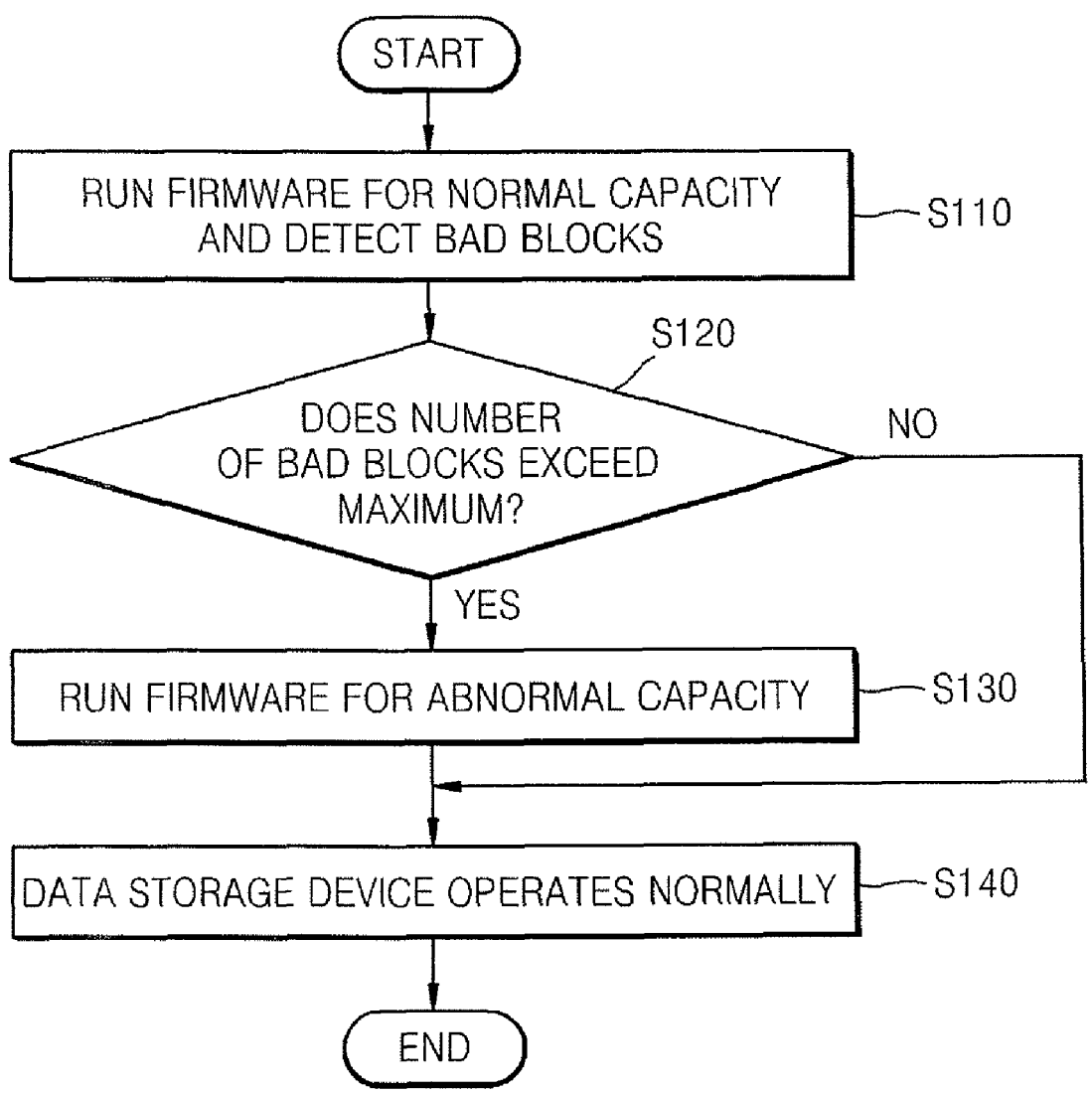

DATA STORAGE DEVICE AND METHOD OF OPERATING THE SAME

CROSS-REFERENCE TO RELATED APPLICATIONS

This application claims priority under 35 U.S.C. §119(a) from Korean Patent Application No. 10-2007-0016120, filed on Feb. 15, 2007, in the Korean Intellectual Property Office, the disclosure of which is incorporated herein in its entirety by reference.

BACKGROUND OF THE INVENTION

1. Field of the Invention

The present general inventive concept relates to a data storage device and a method of operating the same, and more particularly, to a data storage device capable of using part of its normal capacity when the number of bad blocks exceeds a maximum, and a method of operating the same.

2. Description of the Related Art

As electronic industries develop data storage devices, the capacity of the storage devices is rapidly increasing. Nowadays, data storage devices are mounted in most electronic instruments, and portable data storage devices, which can easily store and carry high capacity data, are widely used.

Referring to FIG. 1, a conventional data storage device 10 includes a memory control unit 12 and a memory area 14. The memory control unit 12 drives firmware 22 recorded in the memory area 14 to write or delete data in a user space 24. In FIG. 1, the firmware 22 is recorded in the memory area 14, but the firmware 22 may be recorded in the memory control unit 12.

The memory area 14 includes memory blocks (not shown). When a memory block is defective, it is described as a bad block. Bad blocks may be formed or found during fabrication or later during operation of the data storage device 10.

The maximum number of acceptable bad blocks is determined for a data storage device such as a flash memory. If the firmware 22 detects more bad blocks than the maximum, the whole data storage device is treated as defective. If this occurs during production, the data storage device 10 is discarded. If the bad blocks exceed the maximum during use, the data storage device 10 needs to be operated for read only or operates abnormally.

SUMMARY OF THE INVENTION

The present general inventive concept provides a data storage device capable of using a portion of its normal capacity when the number of bad blocks exceeds a maximum.

The present general inventive concept also provides a method of operating a data storage device capable of using a portion of its normal capacity when the number of bad blocks exceeds the maximum.

The present general inventive concept also provides an electronic instrument including the data storage device.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a data storage device and a method of operating the same which are very economical because a portion of a normal capacity of the data storage device can be used when the number of bad blocks exceeds the maximum.

The foregoing and/or other aspects and utilities of the present general inventive concept may be achieved by providing a data storage device including a memory control unit, a first firmware unit for normal capacity to be run using a first routine according to control of the memory control unit, a second firmware unit for abnormal capacity to be run using a second routine according to control of the memory control unit, and a memory area including a data area to store data under control of one of the first and second firmware units The foregoing and/or other aspects and utilities of the present general inventive concept may also be achieved by providing an electronic apparatus including a data storage device comprising: a memory control unit, a first firmware unit for normal capacity to be run using a first routine according to control of the memory control unit, a second firmware unit for abnormal capacity to be run using a second routine according to control of the memory control unit, and a memory area including a data area to store data under control of one of the first and second firmware units The foregoing and/or other aspects and utilities of the present general inventive concept may also be achieved by providing a data storage device including a memory area including a data area to store data, and a firmware unit to control the data area according to a normal capacity mode and an abnormal capacity mode.

The firmware unit may detect a portion of the data area to be defective in the normal capacity mode, and may read data from the portion of the data area in the abnormal capacity mode.

The firmware unit may not store data in the portion of the data area in the abnormal capacity mode.

The firmware unit may determine whether a portion of the data area is defective, and the firmware unit may control the data area in the normal capacity mode when the defective portion of the data area is smaller than a first reference, and may control the data area in the abnormal capacity mode when the defective portion of the data area is larger than a second reference.

The firmware unit may be recorded in the memory area.

The memory area and the firmware unit may be formed in a single monolithic body.

The firmware unit may include a first firmware unit to control the data area in the normal capacity mode, and a second firmware unit to control the data area in the abnormal capacity mode.

The firmware unit may include a first routine through which the firmware unit controls the data area in the normal capacity mode, and a second routine through the firmware unit controls the data area in the abnormal capacity mode.

The data storage device may further include a memory control unit to control the memory area and the firmware unit to perform at least one of a first operation of storing data and a second operation of reading data as a read-only operation.

The memory control unit, the memory area, and the firmware unit may be formed in a single monolithic body.

The firmware unit may be recorded in the memory control unit.

The foregoing and/or other aspects and utilities of the present general inventive concept may also be achieved by providing an electronic apparatus including a component to perform a predetermine function thereof using data, and a data storage device connected to the component to provide data, and having a memory area including a data area to store data, and a firmware unit to control the data area according to a normal capacity mode and an abnormal capacity mode The foregoing and/or other aspects and utilities of the present general inventive concept may also be achieved by providing an electronic apparatus including a component to perform a predetermine function thereof using data, and a receiving unit connected to the component and connectable to an external data storage device having a memory area including a data area to store data, and a firmware unit to control the data area according to a normal capacity mode and an abnormal capacity mode.

The foregoing and/or other aspects and utilities of the present general inventive concept may also be achieved by providing a method of a data storage device, the method including storing data in a data area of a memory area, and controlling the data area using a firmware unit according to a normal capacity mode and an abnormal capacity mode.

The foregoing and/or other aspects and utilities of the present general inventive concept may also be achieved by providing a computer-readable medium to contain computer-readable medium as a program to execute a method of a data storage device, the method including storing data in a data area of a memory area, and controlling the data area using a firmware unit according to a normal capacity mode and an abnormal capacity mode.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which:

FIGS. 4 through 7 are flowcharts illustrating methods of operating data storage devices according to embodiments of the present general inventive concept.

DETAILED DESCRIPTION OF THE PREFERRED EMBODIMENTS

Figure 1:
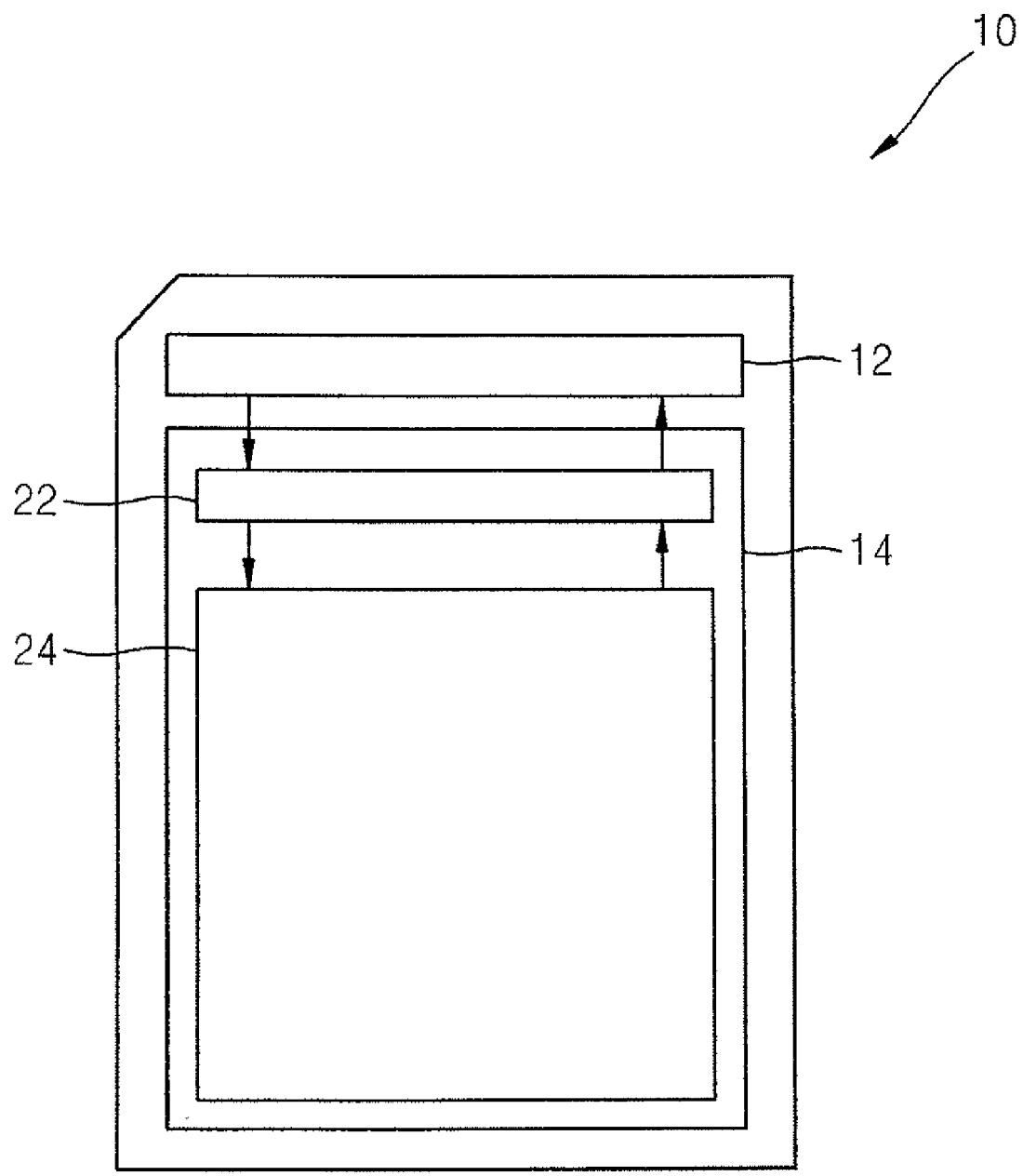
FIG. 1 is a conceptual view of a conventional data storage device.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

A data storage device according to an embodiment of the present general inventive concept includes a memory control unit, firmware for normal capacity, firmware for abnormal capacity, and a memory area. The firmware may operate according to control of the memory control unit. The memory area includes a data area to store data.

The data storage device may be a portable storage device such as a multi-media card (MMC), a secure digital (SD) card, a memory stick (MS), an xD card, a compact flash card (CFC), or a universal flash drive (UFD), or may be mounted in an electronic instrument (apparatus) such as an MP3 player, a digital camera, a notebook computer, a portable media player (PMP), a cellular phone, etc.

Figure 2A:
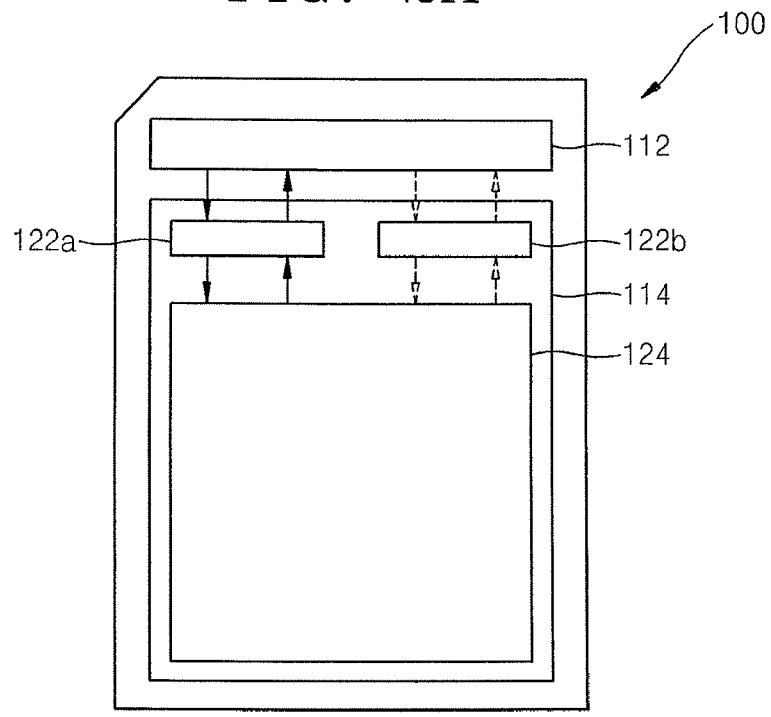
FIGS. 2A through 3B are conceptual views of data storage devices according to embodiments of the present general inventive concept.

FIG. 2A is a view of a data storage device 100 according to an embodiment of the present general inventive concept.

Referring to FIG. 2A, the data storage device 100 includes a memory control unit 112 and a memory area 114. The memory area 114 includes firmware 122*a* for normal capacity, firmware 122*b* for abnormal capacity, and a user space 124.

The memory control unit 112 runs the firmware 122*a* and 122*b* recorded in the memory area 114 to write or delete data in the user space 124. The memory area 114 may be an area including a physical memory device, and the memory control unit 112 may be included in the data storage device 100 and may be independent from the memory area 114.

The firmware 122*a* for normal capacity may be recorded in the memory area 114. Similarly, the firmware 122*b* for abnormal capacity may be recorded in the memory area 114. In the data storage device 100, the memory control unit 112 runs the firmware 122*a* in the initial operation. When the number of bad blocks does not exceed the maximum, the function of the firmware 122*a* is continued and the firmware 122*a* writes, reads, and deletes data.

Here, the bad blocks may be defective blocks or malfunctioning blocks which can not perform a normal operation of storing and reading data from the corresponding block. The blocks may be one or more memory cells to store data therein.

When the firmware 122*a* runs (operates) and the number of bad blocks exceeds the maximum, the firmware 122*b* is run instead of the firmware 122*a*. The firmware 122*b* may be run by the memory control unit 112 or the firmware 122*a*.

The firmware 122*b* functions under the recognition that the memory area 114 has a capacity (memory space) smaller than a normal capacity. The firmware 122*b* may be designed to recognize that the memory area 114 has a certain capacity, for example, half of its normal capacity.

Both of the firmware 122*a* and 122*b* can be recorded in the memory area 114 as illustrated in FIG. 2A, but the present general inventive concept is not limited thereto. The firmware 122*a* may be recorded in the memory control unit 112 and the firmware 122*b* may be recorded in the memory area 114. On the other hand, the firmware 122*a* may be recorded in the memory area 114 and the firmware 122*b* may be recorded in the memory control unit 112.

Figure 2B:
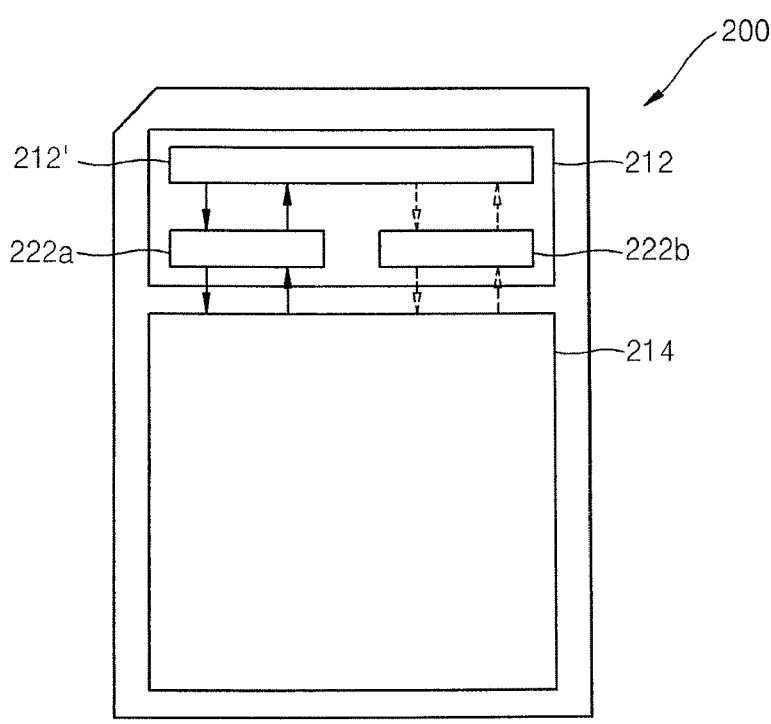

Referring to FIG. 2B, in a data storage device 200 according to another embodiment of the present general inventive concept, firmware 222*a* for normal capacity and firmware 222*b* for abnormal capacity may be recorded in a memory control unit 212. In this case, a control program 212' may be recorded together with the firmware 222*a* and 222*b* in the memory control unit 212. Therefore, a memory area 214 may serve entirely as a user space.

In FIGS. 2A and 2B, solid lines that connect the firmware 122*a* and 222*a* with other elements indicate that the firmware 122*a* and 222*a* is being run. Also, dotted lines that connect the firmware 122*b* and 222*b* with other elements indicate that the firmware 122*b* and 222*b* may be run when the number of bad blocks exceeds the maximum. This manner of using the solid lines and the dotted lines also applies to other figures.

A data storage device according to another embodiment of the present general inventive concept includes a memory control unit, firmware, and a user space. The firmware may operate according to control of the memory control unit, and includes a first routine for normal memory capacity and a second routine for abnormal capacity. The user space includes a data area to store data.

Here, the normal capacity represents a normal mode where the user space 124 or 214 is not defective, the user space 124 or 214 has a capacity larger than a reference capacity, or the user space 124 or 214 has bad memory blocks more than a reference number. The abnormal capacity represents an abnormal mode where at least a portion of the user space 124 or 214 is defective, the user space 124 or 214 has a capacity smaller than a reference capacity, or the user space 124 or 214 has bad memory blocks smaller than a reference number.

The firmware for normal capacity may be firmware to operate in the normal mode, and the firmware for abnormal capacity may be firmware to operate in the abnormal mode.

The firmware is a firmware unit as a first program to control the user space 124 or 214. That is, the firmware is a first firmware unit to control the user space 124 or 214 in the normal mode, and a second firmware unit as a second program to control the user space 124 or 214 in the abnormal mode. Accordingly, the data can be recorded on or read from the user space 124 or 214 in the normal mode or abnormal mode using at least one of the first firmware unit and the second firmware unit.

The firmware for abnormal capacity may have information on the bad blocks and/or information on non-bad blocks, and may access the non-bad blocks to store data therein and/or read data therefrom. It is possible that the firmware for abnormal capacity can read data from at least one of the bad blocks and/or the non-bad blocks.

Figure 3A:
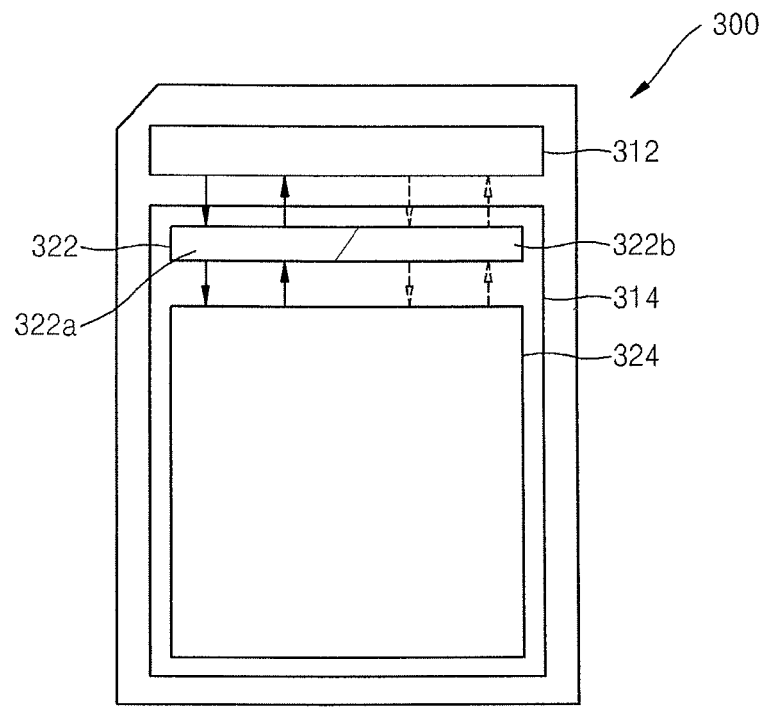

FIG. 3A is a conceptual view of a data storage device 300 according to another embodiment of the present general inventive concept. Referring to FIG. 3A, the data storage device 300 includes a memory control unit 312 and a memory area 314. The memory area 314 may include firmware 322 and a user space 324. The firmware 322 may be a single program and include a first routine 322a that can be run for normal capacity of the memory area 314 and a second routine 322b that can be run for abnormal capacity of the memory area 314.

The data storage device 300 of FIG. 3A may be similar to the embodiments of FIGS. 2A and 2B. However, the memory control unit 312 of FIG. 3A runs or controls the firmware 322 recorded in the memory area 314 to write or delete data in the user space 324. The memory area 314 may be an area including a physical memory device or a memory cell to store data therein, and the memory control unit 312 may be included in the data storage device 300 and may be independent from the memory area 314.

The firmware 322 may be recorded in the memory area 314. In the data storage device 300, the memory control unit 312 runs or controls the first routine 322a of the firmware 322 for normal capacity of the memory area 314. First of all, bad blocks are detected throughout the memory area 314. If the number of bad blocks does not exceed the maximum, the function of the first routine 322a is continued and the first routine 322a writes, reads, and deletes data for the user space 324.

If the first routine 322a of the firmware 322 is run and the number of bad blocks exceeds the maximum, the second routine 322b for abnormal capacity of the memory area 314 is activated and run instead of the first routine 322a in the firmware 322. The second routine 322b may be internally run in the firmware 322. Also, the second routine 322b may be designed to recognize that the memory area 314 has half of its normal capacity.

Figure 3B:
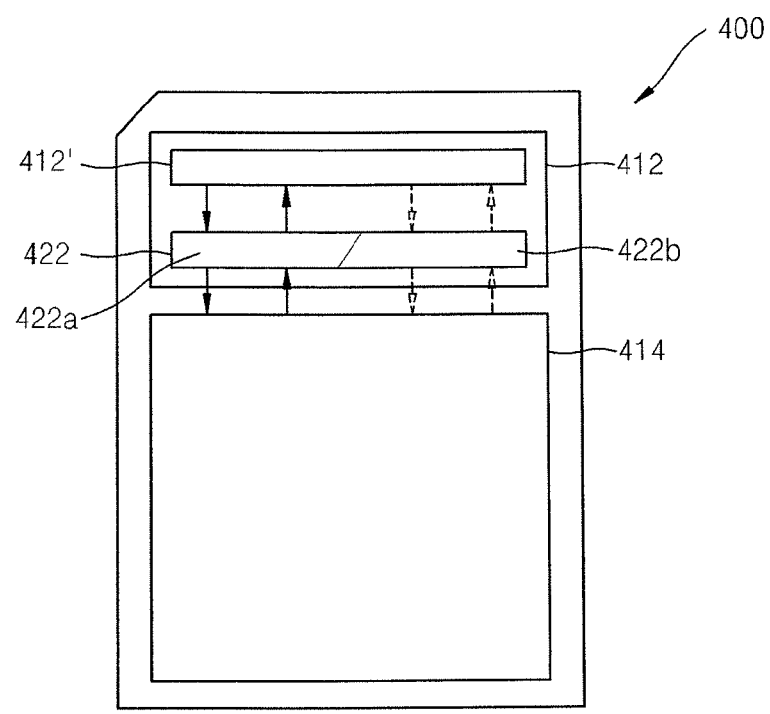

The firmware 322 is recorded in the memory area 324 in FIG. 3A, but the present general inventive concept is not limited thereto. FIG. 3B illustrates a data storage device 400 according to still another embodiment of the present general inventive concept. Referring to FIG. 3B, firmware 422 may be recorded in a memory control unit 412. In this case, a control program 412' may be recorded together with the firmware 422 in the memory control unit 412. Therefore, a memory area 414 may serve entirely as a user space.

Although not specifically illustrated in FIGS. 2A through 3B, the data storage devices 100, 200, 300 and 400 may further include additional components such as an interface unit to be connected to and to communicate with one or more external instruments (apparatus).

A method of operating a data storage device according to another embodiment of the present general inventive concept includes running firmware for normal capacity using a memory control unit to detect bad blocks, and running firmware for abnormal capacity when the number of bad blocks exceeds the maximum.

FIG. 4 is a flowchart illustrating a method of operating a data storage device according to another embodiment of the present general inventive concept. Referring to FIG. 4, in operation S110, a memory control unit runs firmware for normal capacity, and then the firmware detects and, if any, counts bad blocks.

In operation S120, it is checked whether the number of bad blocks exceeds the maximum. If the number of bad blocks does not exceed the maximum, the data storage device performs normal operation.

In operation S130, if the number of bad blocks exceeds the maximum, the data storage device runs firmware for abnormal capacity. Then, the firmware for abnormal capacity recognizes that the data storage device has a smaller than normal capacity and normally performs write, read, and delete operations. In this case, the firmware for abnormal capacity may recognize that the data storage device has a capacity, for example, half of its normal capacity, as described above. Therefore, in operation S140, at least half of the normal capacity of the data storage device may be used.

However, if user data is stored in a part of a user space of the data storage device and the firmware for abnormal capacity is run, the data may be lost or deleted. In order to backup user data, the running of the firmware for abnormal capacity may include: searching existing stored data of a user; and operating the data storage device in a read-only mode when the existing stored data of a user exists.

Figure 5:
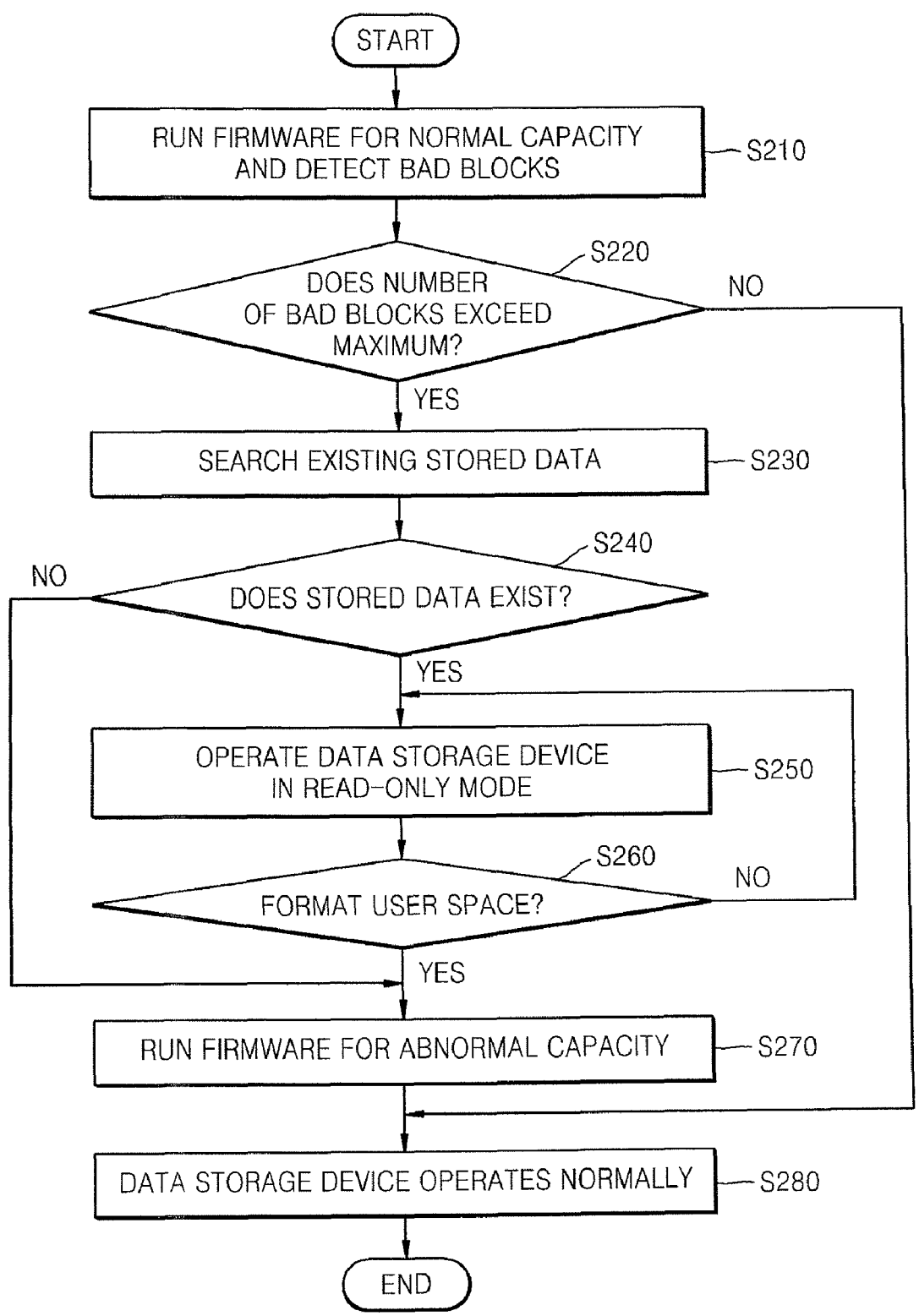

FIG. 5 is a flowchart of a method of operating a data storage device according to another embodiment of the present general inventive concept. Operations S210 and S220 may be the same as the operations S110 and S120, and thus their description will not be repeated. In operation S230, when the number of bad blocks exceeds the maximum, existing stored data of a user is searched. Then, in operation S240, it is determined whether stored data of a user exists. In operation S250, if the stored data of a user exists, the data storage device operates in a read-only mode. A user may read the existing stored data from the data storage device to store the data in other memory device in the read-only mode. In operation S270, if the stored data of a user does not exist, the firmware for abnormal capacity may be run.

The method of operating the data storage device according to another embodiment of the present general inventive concept may include formatting a user space of the data storage device, in operation S260. The formatting may be performed directly before running the firmware for abnormal capacity.

If the user space is not formatted, the data storage device may continue to operate in a read-only mode so as to protect existing user data. If the user formats the user space, the firmware for abnormal capacity may be run in operation S270.

In operation S280, the data storage device may operate normally.

A method of operating a data storage device according to another embodiment of the present general inventive concept includes, in a data storage device including firmware that is run according to control of a memory control unit and includes a first routine for normal capacity and a second routine for abnormal capacity, running the first routine of the firmware using the memory control unit to detect bad blocks, and running the second routine of the firmware when the number of bad blocks exceeds the maximum.

Figure 6:
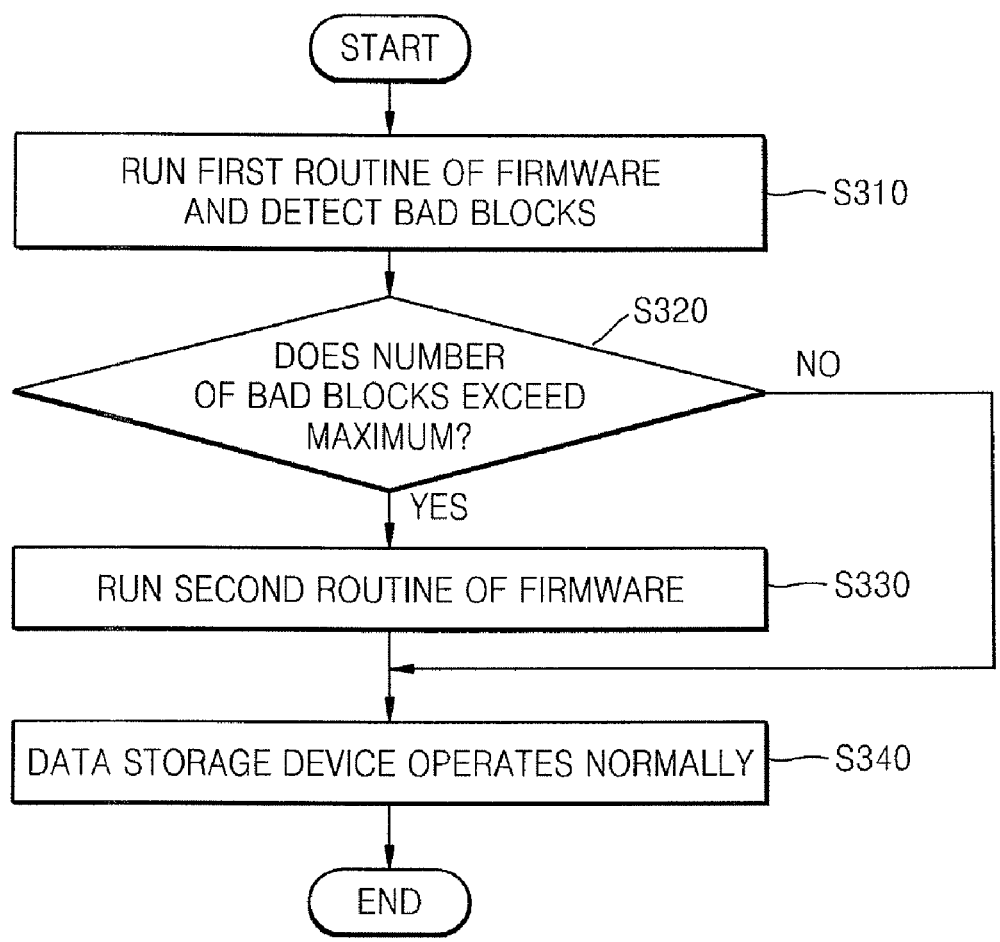

Referring to FIG. 6, in operation S310, a first routine of firmware is run using a memory control unit, and the first routine detects and, if any, counts bad blocks.

In operation S320, it is determined whether the number of the bad blocks exceeds the maximum. If the number of bad blocks does not exceed the maximum, the data storage device operates normally.

In operation S330, if the number of bad blocks exceeds the maximum, a second routine of the firmware is run. Then, the firmware recognizes that the data storage device has a smaller than normal capacity and performs write, read, and delete operations. In this case, the firmware recognizes that the data storage device has half of its normal capacity, as described above. In operation S340, the data storage device may use at least half of its normal capacity.

As described above, when existing user data is stored in part of a user space of the data storage device, the data may be lost. Therefore, in order to backup user data, the running of the second routine of the firmware may further include: searching existing stored data; and operating the data storage device in a read-only mode when stored data of a user exists.

Figure 7:
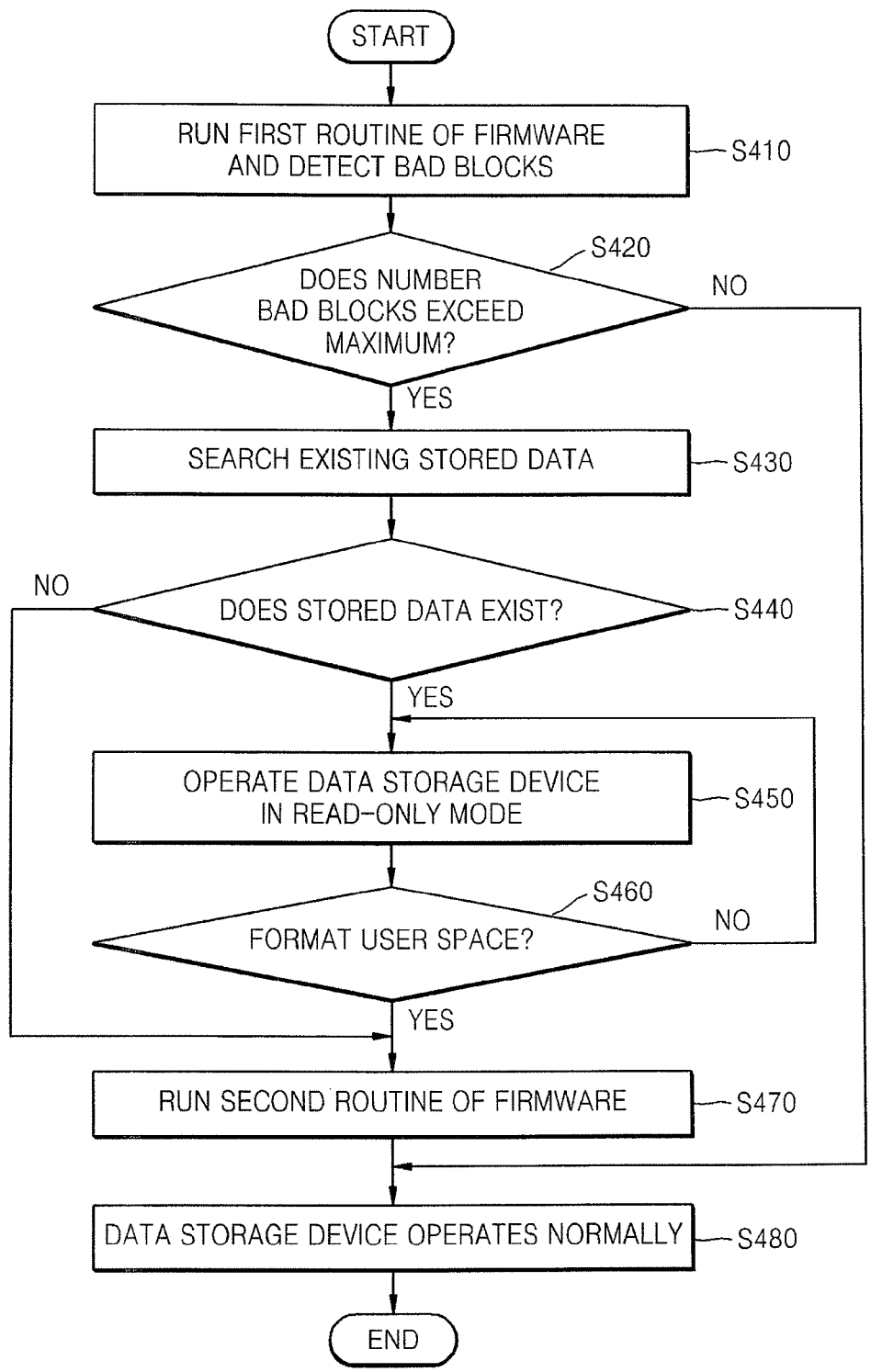

FIG. 7 is a flowchart illustrating a method of operating a data storage device according to another embodiment of the present general inventive concept. Operations S410 and S420 of FIG. 7 may be the same as the operations S310 and S320 of FIG. 6, and thus their description will not be repeated. In operation S430, if the number of bad blocks exceeds the maximum, stored data is searched. In operation S440, it is determined whether the stored data exists. In operation S450, if the stored data of a user exists, the data storage device operates in a read-only mode. A user may read the existing stored data from the data storage device to store the data in other memory device in the read-only mode. In operation S470, if the stored data of a user does not exist, a second routine of the firmware may be run.

In operation S460, the method of operating the data storage device according to another embodiment of the present invention may further include formatting a user space of the data storage device. The formatting may be performed directly before running the second routine of the firmware.

If the user space is not formatted, the data storage device may continue to operate in a read-only mode so as to protect existing user data. If the user formats the user space, the second routine may be run, in operation S470.

In operation S480, the data storage device may operate normally.

The present general inventive concept can also be embodied as computer-readable codes on a computer-readable medium. The computer-readable medium can include a computer-readable recording medium and a computer-readable transmission medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Another embodiment of the present general inventive concept may provide an electronic instrument (apparatus) including any data storage device illustrated in FIGS. 2A through 3B.

The electronic instrument may be a portable storage device such as multi-media card (MMC), a secure digital (SD) card, a memory stick (MS), an xD card, a compact flash card (CFC), or a universal flash drive (UFD), or an electronic instrument such as an MP3 player, a digital camera, a notebook computer, a portable media player (PMP), or a cellular phone. However, the electronic instrument is not limited thereto, and may be any electronic instrument (apparatus) including the data storage device.

Figure 8A:
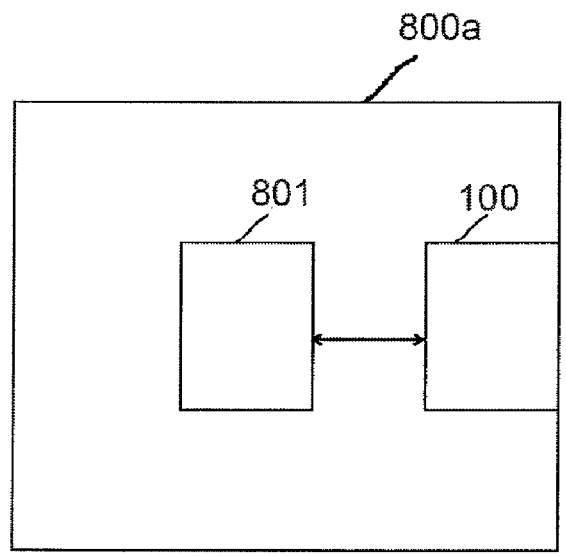
FIGS. 8A and 8B are views illustrating an electronic apparatus usable with a data storage device according to an embodiment of the present general inventive concept.
Figure 8B:
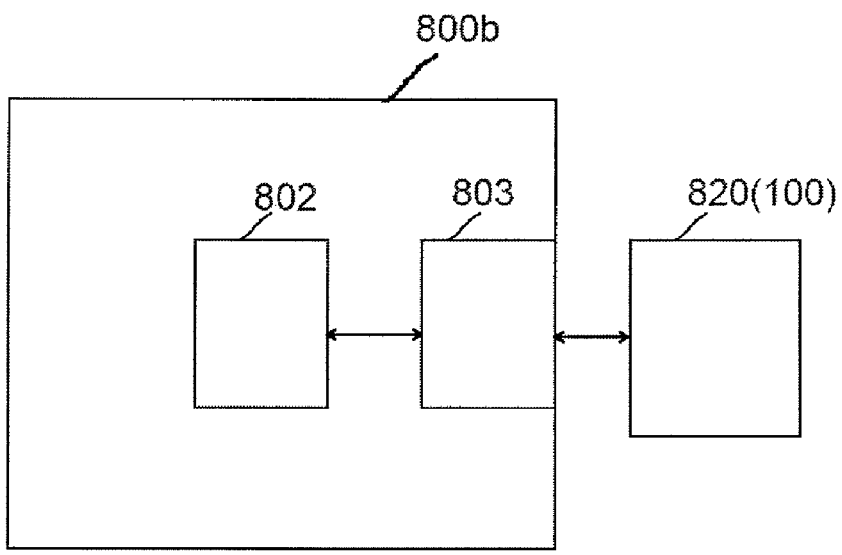

FIGS. 8A and 8B are views illustrating an electronic apparatus 800a or 800b usable with a data storage device 810 or 820 according to an embodiment of the present general inventive concept. Here, the data storage device of FIGS. 1 through 3 can be used as the data storage device 810 or 820 of FIGS. 8A and 8B. Referring to FIG. 8A, the electronic apparatus 800a may include a component 801 to perform a function of the electronic apparatus, and a data storage device 100 to communicate with the component 810 to store data according to the function of the electronic apparatus. Referring to FIG. 8B, the electronic apparatus 800b may have a component 802 to perform a function of the electronic apparatus, and a receiving unit 803 to be connectable to an external data storage unit 820.

By using a data storage device and a method of operating the same according to the present invention, even if the number of bad blocks exceeds the maximum, part of the normal capacity can be used, thereby saving a cost.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A data storage device, comprising:
   a memory area containing a user space including a data area to store data;
   a firmware unit to control the data area according to a normal capacity mode and an abnormal capacity mode; and
   a memory control unit,
   wherein the firmware unit includes a first firmware unit for normal capacity to be run according to control of the memory control unit and a second firmware unit for abnormal capacity to be run according to control of the memory control unit, and
   wherein the user space can store data under control of one of the first and second firmware units.

2. The data storage device of claim 1, wherein the first firmware unit for normal capacity is recorded in the memory area.

3. The data storage device of claim 1, wherein the second firmware unit for abnormal capacity is recorded in the memory area.

4. The data storage device of claim 1, wherein the first firmware unit for normal capacity is recorded in the memory control unit.

5. The data storage device of claim 1, wherein the second firmware unit for abnormal capacity is recorded in the memory control unit.

6. The data storage device of claim 1, wherein the abnormal capacity is half of the normal capacity.

7. A data storage device, comprising:
   a memory area containing a user space including a data area to store data; and
   a firmware unit to control the data area according to a normal capacity mode and an abnormal capacity mode,
   wherein the firmware unit is run according to control of the memory control unit, and includes a first routine for normal capacity of a memory area and a second routine for abnormal capacity of the memory area;
   wherein the user space includes the data area to store data under control of the firmware unit; and
   wherein the abnormal capacity is half of the normal capacity.

8. The data storage device of claim 7, wherein the firmware is recorded in the memory control unit.

9. The data storage device of claim 7, wherein the firmware is recorded in the memory area.

10. A data storage device comprising:
    a memory unit to store data;
    a first firmware unit for a normal capacity of the memory unit; and
    a second firmware unit for an abnormal capacity of the memory unit;
    wherein the first firmware unit stores the data in the data area of the memory unit when the memory unit is in the normal capacity, and the second firmware unit stores the data in the data area of the memory unit when the memory unit is in the abnormal capacity.

11. The data storage device of claim 10, further comprising:
    a memory control unit to determine a state of the memory unit as the normal capacity and the abnormal capacity, and to control the first firmware unit and the second firmware unit to store the data according to the normal capacity and the abnormal capacity, respectively.

12. The data storage device of claim 11, wherein:
    the first firmware unit and the second firmware unit are included in the memory control unit.

13. The data storage device of claim 10, wherein:
    the memory unit comprises a memory area; and
    the memory area comprises the first firmware unit, the second firmware unit, and a user area to store the data according to control of one of the first firmware unit and the second firmware unit.

* * * * *